United States Patent

Joshi

(10) Patent No.: US 6,862,523 B2
(45) Date of Patent: Mar. 1, 2005

(54) BOWING COEFFICIENT REPRESENTATION OF CURVATURE OF GEOGRAPHIC FEATURES

(75) Inventor: Rajashri Joshi, Schaumburg, IL (US)

(73) Assignee: Navteq North America, LLC, Chicago, IL (US)

(*) Notice: Subject to any disclaimer, the term of this patent is extended or adjusted under 35 U.S.C. 154(b) by 39 days.

(21) Appl. No.: 10/714,131

(22) Filed: Nov. 14, 2003

(65) Prior Publication Data

US 2004/0107047 A1 Jun. 3, 2004

Related U.S. Application Data

(63) Continuation of application No. 09/772,587, filed on Jan. 30, 2001, now Pat. No. 6,681,177.

(51) Int. Cl.[7] ............................................. G01C 21/00
(52) U.S. Cl. ........................ 701/208; 701/25; 701/207; 701/26; 340/988; 340/702; 340/157; 340/155
(58) Field of Search .......................... 701/208, 25, 207, 701/26; 340/988; 702/157, 155

(56) References Cited

U.S. PATENT DOCUMENTS

| | | |
|---|---|---|
| 5,307,419 A | 4/1994 | Tsujino et al. |
| 5,438,517 A | 8/1995 | Sennott et al. |
| 5,470,233 A | 11/1995 | Fruchterman et al. |
| 5,497,451 A | 3/1996 | Holmes |
| 5,566,288 A | 10/1996 | Koerhsen |
| 5,661,650 A | 8/1997 | Sekine et al. |
| 5,978,731 A | 11/1999 | Matsuda |
| 6,023,653 A | 2/2000 | Ichimura et al. |
| 6,029,173 A | 2/2000 | Meek et al. |
| 6,138,084 A | 10/2000 | Mine |
| 6,278,928 B1 | 8/2001 | Araga et al. |
| 6,366,851 B1 | 4/2002 | Chojnacki et al. |
| 6,681,177 B2 * | 1/2004 | Joshi .......................... 701/208 |
| 6,728,392 B1 | 4/2004 | Joshi .......................... 382/104 |

FOREIGN PATENT DOCUMENTS

| | | | |
|---|---|---|---|
| EP | 0 394 517 B1 | 6/1993 | ........... G01C/21/22 |
| EP | 0 789 225 A1 | 8/1997 | ........... G01C/21/20 |
| EP | 0 807 803 A2 | 11/1997 | ........... G01C/21/20 |
| EP | 0 919 788 A1 | 6/1999 | ........... G01C/21/20 |
| WO | WO 95/32483 | 11/1995 | ............ G06K/9/20 |

OTHER PUBLICATIONS

Pocket Reference, p. 317–by Thomas J. Glover.
U.S. Appl. No. 09/729,939, filed Dec. 5, 2000, entitled "Method and System for Representation of Geographic Features in a Computer–Based System" (not yet published).

* cited by examiner

*Primary Examiner*—Thomas G. Black
*Assistant Examiner*—Olga Hernandez
(74) *Attorney, Agent, or Firm*—Jon D. Shutter; Frank J. Kozak; Lawrence M. Kaplan

(57) ABSTRACT

The degree to which a linearly extending feature, such as a road, curves is indicated using a bowing coefficient. The bowing coefficient at a given location along a linearly extending feature is determined by comparing the distance along the feature between two points on either side of the given location (or an approximation of the distance) to a straight-line distance between these same two points. Bowing coefficient data can be used by various vehicle systems that require information about the curvature of linearly extending features, such as roads upon which the vehicle is traveling.

19 Claims, 4 Drawing Sheets

BOWING COEFFICIENT REPRESENTATION OF CURVATURE OF GEOGRAPHIC FEATURES

REFERENCE TO RELATED APPLICATIONS

The present application is a continuation of Ser. No. 09/772,587 filed Jan. 30, 2001, now U.S. Pat. No. 6,681,177, the entire disclosure of which is incorporate herein by reference.

BACKGROUND OF THE INVENTION

The present invention relates to geographic data and more particularly, the present invention relates to a way to represent how much a linearly extending geographic feature (such as a road) curves by using a bowing coefficient.

Various new vehicle safety systems have been developed that provide warnings to the vehicle driver or that modify operation of the vehicle (or component thereof) based upon conditions around the vehicle or other factors. Examples of some of these new vehicle safety systems include automatic headlight aiming, automatic (or adaptive) cruise control, obstacle warning, curve warning, intersection warning, lane departure warning, collision warning, and adaptive transmission shift control. Some of these vehicle safety systems use sensor equipment (e.g., radar and cameras) to detect the current state of the roadway and environment around the vehicle. Some of these vehicle safety systems use digital map data as a component. Digital map data are used to identify the location and shape of the road ahead of and around the vehicle. Digital map data can also be used to identify relatively permanent objects or features along the roads.

Included among the types of digital map data used by some of these vehicle systems are data that indicate the curvature of the road. In some digital map databases, the curvature of a road at given location is indicated by a radius of curvature value (or inverse thereof). Some vehicle safety systems use these radius of curvature data to modify operation of the vehicle. For example, an automatic cruise control system in a vehicle uses the data that indicate curvature of a road at the location along the road at which a vehicle is traveling to determine an acceptable speed range for the vehicle. After determining an acceptable speed range, the automatic cruise control application adjusts the speed of the vehicle if necessary.

The map database used in this type of vehicle safety system includes data indicating the positions of points along roads including data indicating the radius of curvature at the various points along the roads. When forming this type of map database, curvature values are computed using data that identify the coordinates of a series of points (referred to a "shape points") through which the road passes.

Although using computed values of radius of curvature to represent road shape is satisfactory for some vehicle applications, there is room for improvement. The computed radius of curvature values can be affected by the type of function (e.g., piecewise linear, b-spline, etc.) that is used to approximate the given set of shape points. Furthermore, small changes in the approximating function may produce large changes in the curvature value. Also, small changes in the data point locations themselves may produce a large change in a computed radius of curvature.

Accordingly, there is a need for another way to represent road geometry in a geographic database.

SUMMARY OF THE INVENTION

To address these and other objectives, the present invention comprises a way to represent the curvature of a linearly extending feature, such as a road. The curvature of a linearly extending feature, such as a road, is represented using a bowing coefficient. The bowing coefficient at a given location along a linearly extending feature is determined by comparing the distance along the feature between two points on either side of the given location (or an approximation of the distance) to a straight-line distance between these same two points. Bowing coefficient data can be used by various vehicle systems that require information about the curvature of linearly extending features, such as roads upon which the vehicle is traveling.

DETAILED DESCRIPTION OF THE PRESENTLY PREFERRED EMBODIMENTS

I. Definitions

Figure 1:
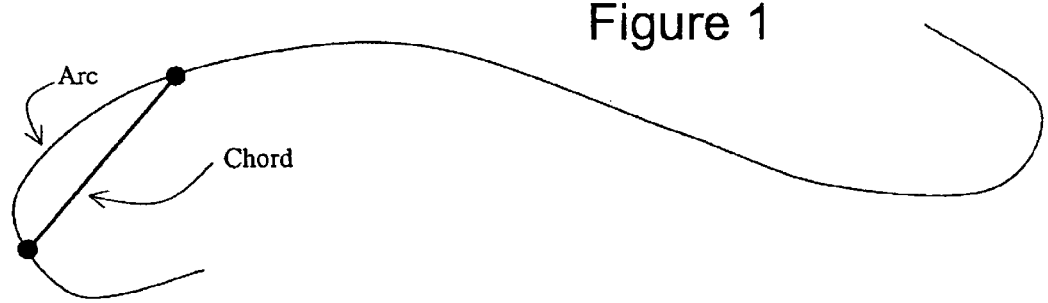
FIG. 1 is a diagram used to illustrate some of the terminology in this specification.

The following terms are illustrated in FIG. 1.

"Chord" refers to the straight-line segment joining any two points on a road segment.

"Chord length" refers to the length of the straight-line segment joining any two points on a road segment.

"Arc" refers to the portion of a road segment between any two points on the road segment.

"Arc length" refers to the length (or approximation thereof) of the portion of a road segment between any two points on the road segment.

As used in this specification, the word "curvature" refers to the general property of a linearly extending feature being curved and is not restricted to a mathematical definition, except as otherwise indicated. The word "curvature" in the phrase "radius of curvature" is understood to have its mathematical meaning.

II. Overview

Figure 2:
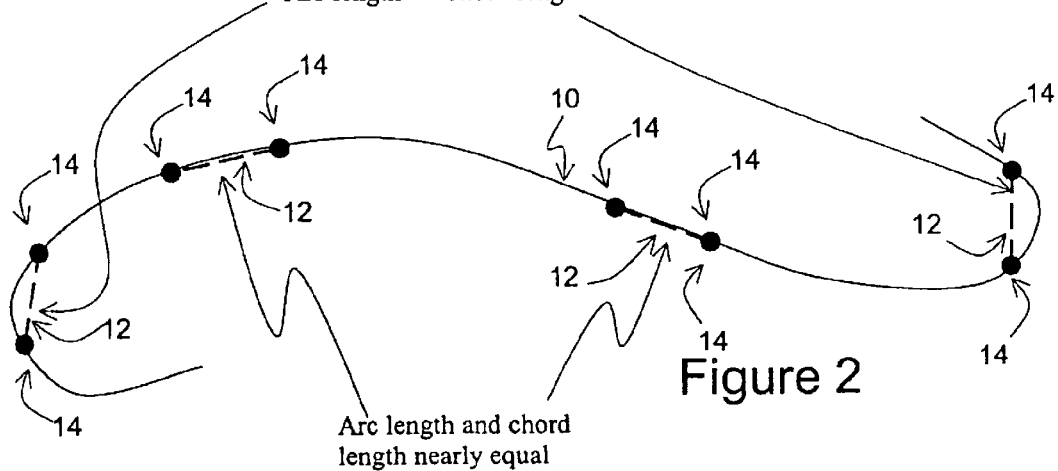
FIG. 2 is a diagram used to illustrate the bowing coefficient at different locations along a road.

FIG. 2 shows a road segment 10. Several chords 12 have been drawn (in dashed lines) between pairs of points 14 on this segment 10. From FIG. 2, it can be seen that the portions of the road segment, which are nearly straight, have arc lengths which are nearly equal to the corresponding chord lengths. Conversely, portions of the road segment that are curved have much larger arc lengths than corresponding chord lengths. This means that for relatively straight portions of a road segment, the ratio of arc length to chord length is close to 1, and for relatively curved portions of a road segment, the ratio of arc length to chord length is significantly greater than 1. In other words, the ratio of arc length to chord length is an indication of the local curvature of the road segment.

This relationship between curvature of a road segment, the chord length, and the arc length is described by the following.

$$\frac{A}{C} \sim \kappa$$

where C is the chord length, A is the arc length and κ is the curvature (i.e., using the mathematical definition of "curvature").

For purposes of this specification, the ratio of A to C is referred to as the "bowing coefficient." The "bowing coefficient." is a measure of how much a portion of road segment between two points bends or bows out from the straight line joining these same two points.

Figure 3:
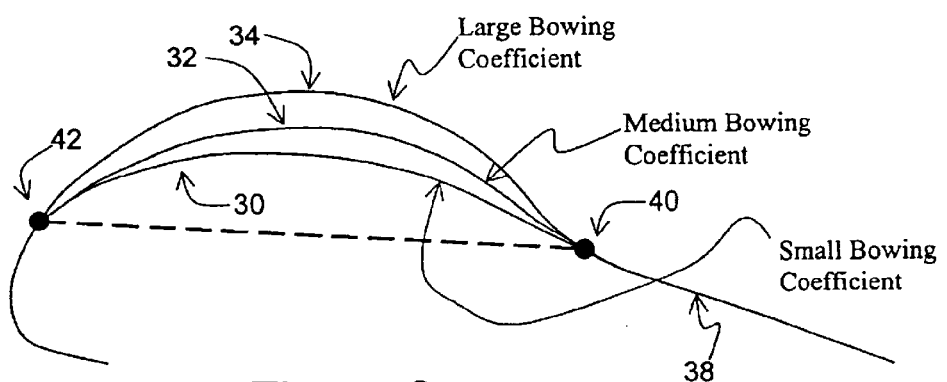
FIG. 3 is a diagram that illustrates how the bowing coefficient varies with curvature.

FIG. 3 illustrates the variation in the bowing coefficient with curvature. FIG. 3 shows three alternative paths 30, 32, and 34 along a road segment 38. Each of these different paths represents a different alternative road configuration between the points 40 and 42. As shown by FIG. 3, the greater the curvature, the greater the bowing coefficient.

III. Implementation

The bowing coefficient can be used by various vehicle systems and applications that use data that represent road geometry. For example, the bowing coefficient can be used by an automatic cruise control application. Use of the bowing coefficient by an automatic cruise control application is described in connection with FIGS. 4 and 5.

Figure 4:
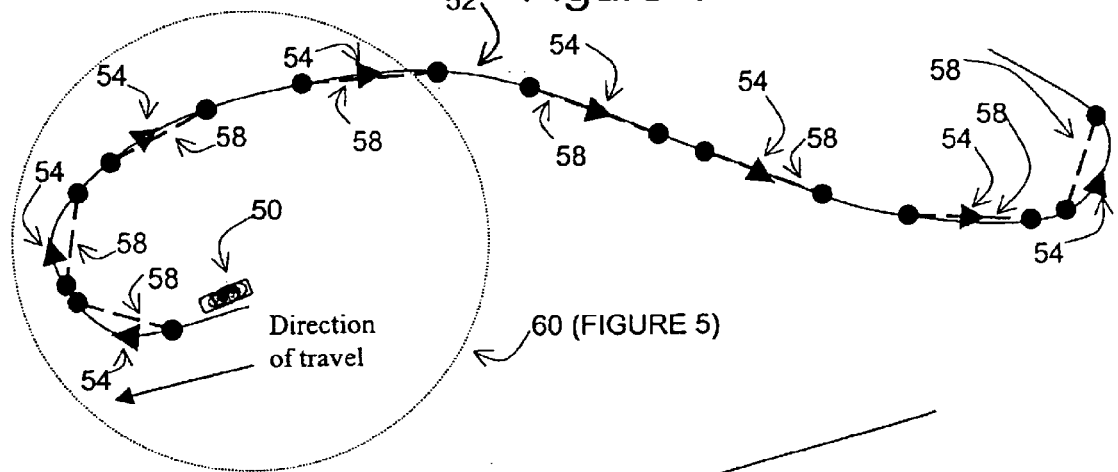

In FIG. 4, a vehicle 50 having an automatic cruise control system travels along a road segment 52. The automatic cruise control system obtains data indicating the position of the vehicle with respect to the road as represented by data contained in a map database. This function can be performed using known vehicle positioning technology, such as GPS, dead-reckoning, and so on.

As the vehicle 50 travels along the road segment 52, the automatic cruise control application in the vehicle 50 adjusts the speed of the vehicle based on the bowing coefficient of the road. In FIG. 4, the arrows 54 indicate the instantaneous positions of the vehicle. The chords 58 corresponding to these positions are also shown.

Figure 5:
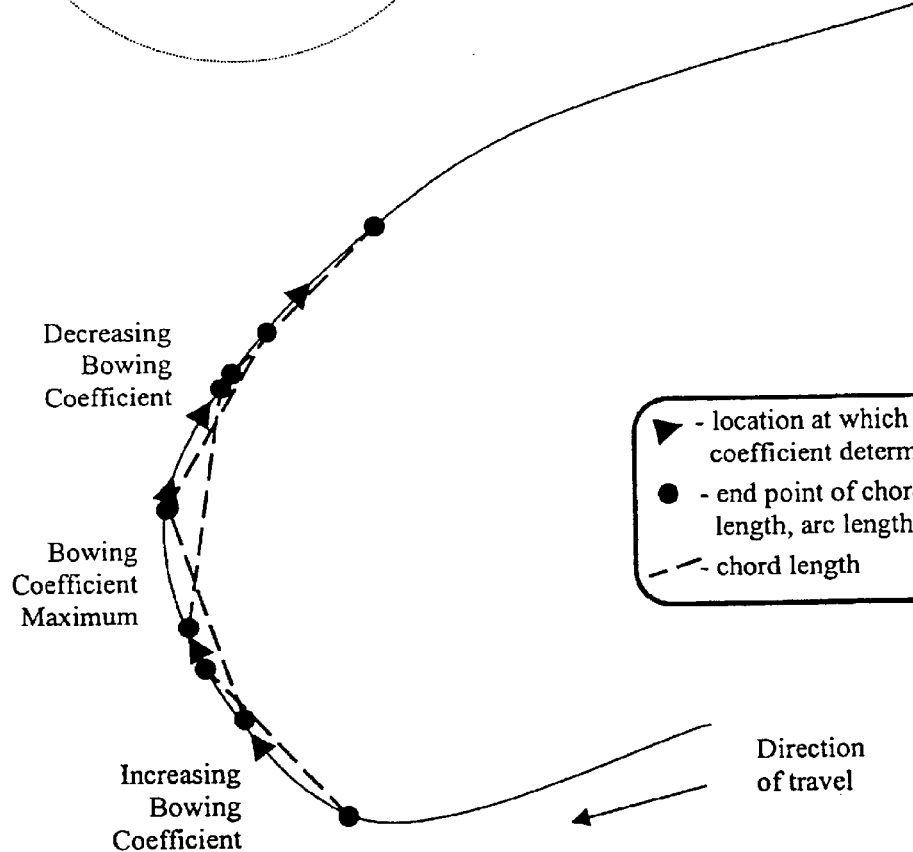
FIG. 5 is an enlarged portion of the area encompassed within the dotted circle in FIG. 4.

According to one embodiment, at each position 54, the automatic cruise control application in the vehicle selects two points straddling the position at which the vehicle is located. The automatic cruise control application then computes the chord length C, the arc length A and the bowing coefficient using the two points. As indicated in FIG. 5, as the vehicle moves into the curve, the bowing coefficient increases, and as the vehicle comes out of the curve the bowing coefficient decreases, as is expected. Using these computed values of the bowing coefficients, the automatic cruise control application in the vehicle adjusts the vehicle speed accordingly.

The selection of the two points that straddle the position of the vehicle is configurable so that the bowing coefficient derived therefrom is suitable for the application by which it is used. As an example, the distance (or distance range) of each of the two points from the position of the vehicle is configurable.

As illustrated in FIG. 5, some of the arc lengths and chord lengths overlap for successive positions at which the bowing coefficient is determined. As previously indicated, the selection of the points used to determine the bowing coefficient is configurable so that an appropriate measure of the curvature is obtained. There is no constraint that the arc lengths and chord lengths not overlap.

IV. Alternative Embodiments

A. Using Previously Calculated Bowing Coefficient Data

According to one alternative embodiment, a vehicle safety system, such as automatic cruise control, uses a map database that includes bowing coefficients for points along roads. According to this alternative embodiment, the values for the bowing coefficient at points along roads are computed in advance by the database developer and stored in the geographic database. The geographic database, which includes the computed values for the bowing coefficient for points along roads, is installed in the vehicle and used by vehicle safety systems, such as automatic cruise control.

An advantage of storing computed values of the bowing coefficient in the map database used by the vehicle safety system is that it eliminates the need to compute these values in the vehicle.

B. Calculating Bowing Coefficients

There are several different ways that the bowing coefficient can be calculated. One way to calculate a bowing coefficient is described in connection with FIG. 6.

Figure 6:
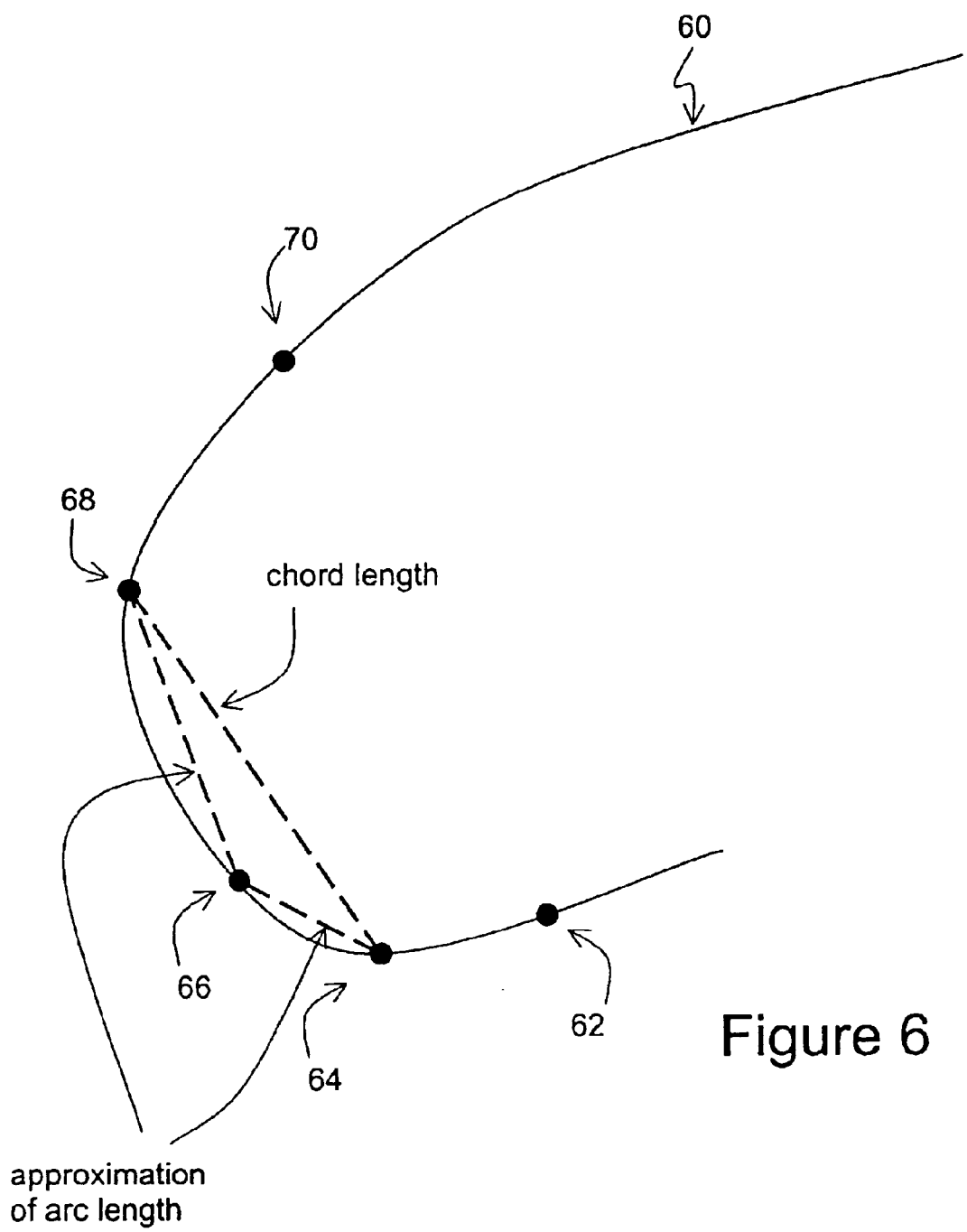
FIG. 6 is a diagram illustrating operation of an alternative embodiment.

FIG. 6 shows a portion of a road 60. Along the road are shape points 62, 64, 66, 68, and 70. These shape points are points at which the geographic coordinates of the location of the road are known. The geographic coordinates at these locations may be determined using various data collection procedures. For example, the geographic coordinates at these positions may be determined using GPS equipment. Alternatively, the geographic coordinates at these positions may be determined from aerial photographs.

According to one alternative embodiment, a value of the bowing coefficient is determined for each shape point. According to this alternative embodiment, a value of the bowing coefficient at a given shape point can be approximated by comparing the sum of the distances from the given shape point to the two shape points immediately adjacent to the given shape point to the straight-line distance between the two adjacent shape points. According to this alternative, the arc length is approximated by using two "chord lengths."

For example, to determine the bowing coefficient for the shape point labeled 66, the distance from the shape point 64 to the shape point 66 is summed with distance from the shape point 66 to the shape point 68. Then, this sum is divided by the distance from the shape point 64 to the shape point labeled 68 in order to determine the bowing coefficient at the shape point 66. Bowing coefficients for the rest of the shape points can be determined in a similar manner. The values of the bowing coefficients can then be stored with the coordinates of the shape points in a geographic database. Alternatively, using this method, bowing coefficients can be computed on-the-fly, as needed, by an application in the vehicle during runtime.

Figure 7:
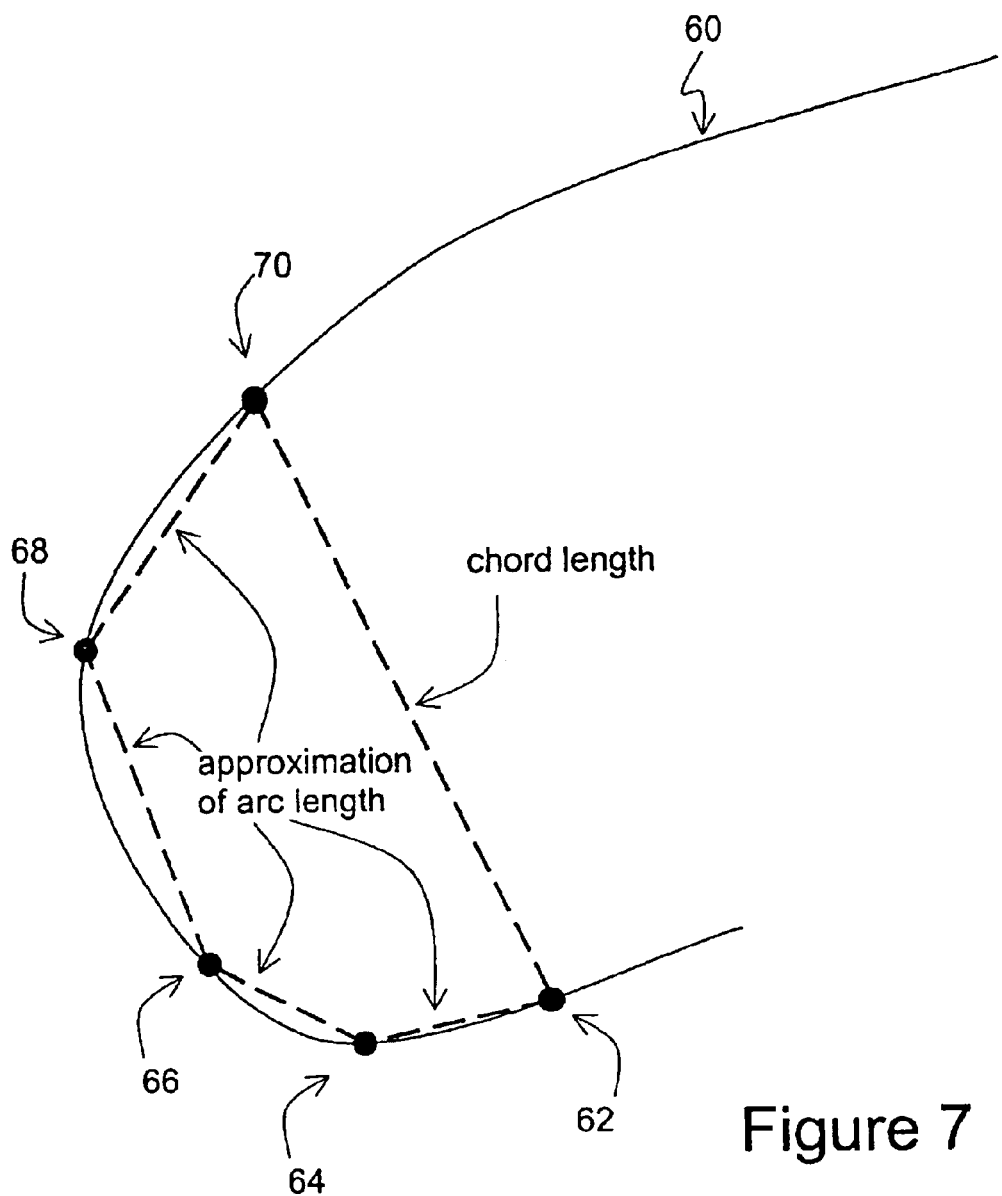
FIG. 7 is a diagram illustrating operation of another alternative embodiment.

According to another alternative, an approximation of the bowing coefficient at a given shape point can be determined by taking into account the distances to additional shape points beyond those immediately adjacent to the given shape point. FIG. 7 illustrates this embodiment. FIG. 7 shows the same portion of road that is shown in FIG. 6. In FIG. 7 the bowing coefficient at the point 66 is approximated by first summing the straight-line distances from the point 62 to the point 64, the point 64 to the point 66, the point 66 to the point 68, and the point 68 to the point 70. The sum of these distances is then divided by the straight-line distance between the point 62 and the point 70 thereby yielding the bowing coefficient at the point 66. According to this alternative, the arc length is approximated by using four "chord lengths."

In FIG. 7, two points were selected on either side of the point at which the bowing coefficient was determined. Alternatively, any number of points can be selected on either side of the point at which the bowing coefficient is determined.

According to still another alternative, the distances from the point along a road at which the bowing coefficient is determined to the points adjacent thereto used in determining the bowing coefficient can be actual distances as-the-vehicle-travels. The actual distances as-the-vehicle-travels can be collected using odometer or speed pulse data or determined from examination of aerial or satellite photographs.

C. Other Alternatives

In another alternative, the values of the bowing coefficient can be computed on the fly in the vehicle using data representing the road geometry, such as shape point data.

The new method described here can be used in combination with the existing radius of curvature approach to improve the robustness and effectiveness of various vehicle applications.

In the embodiments described above, bowing coefficient data were used to represent the curvature of roads. In alternative embodiments, bowing coefficient data can be used to represent the curvature of other kinds of linearly extending features, such as rivers, railroad tracks, boundaries, trajectories, ferries, and so on.

V. Advantages

Several advantages follow from using bowing coefficients to represent curvature. First, using bowing coefficients to represent the curvature of linearly extending geographic features, such as roads, does not involve the computation of radius of curvature values which are prone to large errors. Further, using bowing coefficients to represent the curvature of linearly extending features is less computationally intensive than using radius of curvature values. In addition, bowing coefficients can be derived from data that are stored as a set of shape points (piecewise linear approximation), polynomial spline control points, etc.

It is intended that the foregoing detailed description be regarded as illustrative rather than limiting and that it is understood that the following claims including all equivalents are intended to define the scope of the invention.

I claim:

1. A method of representing road geometry comprising:
   determining an arc length between two points along a road;
   determining a chord length between said points along the road; and
   comparing said arc length to said chord length;
   whereby a result of said comparing is an indication of how much the road curves between said two points.

2. The method of claim 1 further comprising:
   using said indication of how much the road curves to adjust a speed of vehicle.

3. The method of claim 1 further comprising:
   storing said indication of how much the road curves in a geographic database.

4. The method of claim 1 wherein said determining steps are performed using shape point data that represent geographic coordinates at locations along the road.

5. The method of claim 1 wherein said step of comparing is performed by an application in a vehicle.

6. The method of claim 5 wherein said step of comparing is performed using data contained in a geographic database located in said vehicle.

7. The method of claim 1 wherein said step of determining said are length comprising determining an approximation of a distance along the road between said points.

8. The method of claim 1 wherein said step of determining said chord length comprising determining an approximation of a straight-line distance between said points.

9. The method of claim 1 wherein said result of said comparing is a bowing coefficient.

10. A geographic database formed according to the process of claim 1.

11. A geographic database comprising:
    a data representation of a plurality of roads in a geographic region;
    wherein said data representation includes an indication of curvature along at least one of said roads; and
    wherein said indication of curvature includes a comparison between an arc length between paints along the road and a chord length between said points.

12. A method of operating a vehicle along roads using the geographic database of claim 11, comprising:
    using said indication of curvature to adjust a speed of a vehicle.

13. The method of operating the vehicle of claim 12 wherein a speed at which said vehicle is moving is reduced as said vehicle approaches a portion of said roads at which said comparison of said arc length and said chord length is relatively higher.

14. The method of operating the vehicle of claim 12 wherein a speed at which said vehicle is moving is increased as said vehicle approaches a portion of said roads at which said comparison of said arc length and said chord length is relatively lower.

15. The geographic database of claim 11 wherein said arc length is an approximation of a distance along the road between said points.

16. The geographic database of claim 11 where said chord length is an approximation of a straight-line distance between said points.

17. The geographic database of claim 11 where said comparison between said arc length and said chord length is a bowing coefficient.

18. A method of determining how much a road curves comprising:
    determining an approximation of an arc length between two points along the road;
    determining an approximation of a chord length between said points; and
    comparing said arc length to said chord length, wherein a result of said comparing is an indication of how much the road curves between said points.

19. The method of claim 18 wherein said steps determining are performed using shape point data that represent geographic coordinates along the roads.

* * * * *